United States Patent
Bakke et al.

(10) Patent No.: US 8,819,242 B2
(45) Date of Patent: Aug. 26, 2014

(54) METHOD AND SYSTEM TO TRANSFER DATA UTILIZING CUT-THROUGH SOCKETS

(75) Inventors: Mark A. Bakke, Maple Grove, MN (US); David Patrick Thompson, Rogers, MN (US); Timothy J. Kuik, Lino Lakes, MN (US); Paul Harry Gleichauf, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 1723 days.

(21) Appl. No.: 11/468,942

(22) Filed: Aug. 31, 2006

(65) Prior Publication Data

US 2008/0059644 A1 Mar. 6, 2008

(51) Int. Cl.
*G06F 15/16* (2006.01)
*H04L 29/06* (2006.01)
*H04L 29/08* (2006.01)

(52) U.S. Cl.
CPC .......... *H04L 67/2895* (2013.01); *H04L 67/28* (2013.01); *H04L 69/161* (2013.01); *H04L 67/289* (2013.01); *H04L 67/2871* (2013.01); *H04L 69/32* (2013.01); *H04L 69/16* (2013.01); *H04L 69/162* (2013.01); *H04L 67/2814* (2013.01)
USPC ........... 709/227; 709/250; 709/216; 709/211; 370/466; 710/22; 710/48

(58) Field of Classification Search
USPC .............. 709/250, 227, 216, 211; 710/22, 48; 370/466
See application file for complete search history.

(56) References Cited

U.S. PATENT DOCUMENTS

| | | | | |
|---|---|---|---|---|
| 4,145,739 A | * | 3/1979 | Dunning et al. | 709/211 |
| 4,484,264 A | * | 11/1984 | Friedli et al. | 709/250 |
| 4,945,473 A | * | 7/1990 | Holtey et al. | 703/25 |
| 5,175,818 A | * | 12/1992 | Kunimoto et al. | 709/250 |
| 5,247,616 A | * | 9/1993 | Berggren et al. | 709/212 |
| 5,517,662 A | * | 5/1996 | Coleman et al. | 709/201 |
| 5,557,744 A | * | 9/1996 | Kobayakawa et al. | 709/232 |
| 5,884,046 A | * | 3/1999 | Antonov | 709/238 |
| 6,052,737 A | * | 4/2000 | Bitton et al. | 709/248 |
| 6,085,277 A | * | 7/2000 | Nordstrom et al. | 710/263 |

(Continued)

OTHER PUBLICATIONS

McLaughlin, L., "Making Multicore Fly", [online]. Technology Review [observed on Dec. 16, 2005]. Retrieved from the Internet: <URL: http://www.technologyreview.com/read_article.aspx?id=16060&ch=infotech>, (2005©), 3 pgs.

*Primary Examiner* — Tamara T Kyle
*Assistant Examiner* — Anthony Fabbri
(74) *Attorney, Agent, or Firm* — Schwegman Lundberg & Woessner, P.A.

(57) ABSTRACT

A method and system to exchange information between computer applications are provided. The system may include a source operating system, a destination operating system and an offload stack, all residing on the device. The source operating system and the destination operating system appear to users as distinct network entities. The offload stack may be configured to function as an intermediate network device for the source operating system. The offload stack, in one embodiment, comprises a back end to receive a message from the source operating system to the destination operating system, an analyzer to determine that the destination operating system resides on the device and a cut though socket module to process the message such that a network layer of the offload stack is bypassed.

18 Claims, 5 Drawing Sheets

(56) References Cited

U.S. PATENT DOCUMENTS

| | | | |
|---|---|---|---|
| 6,141,701 A * | 10/2000 | Whitney | 710/5 |
| 6,233,619 B1 * | 5/2001 | Narisi et al. | 709/230 |
| 6,360,262 B1 * | 3/2002 | Guenthner et al. | 709/226 |
| 6,366,583 B2 * | 4/2002 | Rowett et al. | 370/401 |
| 6,427,171 B1 * | 7/2002 | Craft et al. | 709/230 |
| 6,678,726 B1 * | 1/2004 | Moshaiov | 709/221 |
| 6,697,868 B2 * | 2/2004 | Craft et al. | 709/230 |
| 6,751,676 B2 * | 6/2004 | Fukuhara | 709/250 |
| 6,757,725 B1 * | 6/2004 | Frantz et al. | 709/223 |
| 6,757,744 B1 * | 6/2004 | Narisi et al. | 709/250 |
| 7,362,709 B1 * | 4/2008 | Hui et al. | 370/237 |
| 7,937,447 B1 * | 5/2011 | Cohen et al. | 709/212 |
| 7,941,800 B2 * | 5/2011 | Leis et al. | 718/1 |
| 2001/0005381 A1 * | 6/2001 | Sugiyama | 370/466 |
| 2002/0062389 A1 * | 5/2002 | Vertes | 709/238 |
| 2002/0143962 A1 * | 10/2002 | Carter | 709/229 |
| 2003/0014544 A1 * | 1/2003 | Pettey | 709/249 |
| 2004/0003131 A1 * | 1/2004 | Curtis | 709/315 |
| 2004/0013117 A1 * | 1/2004 | Hendel et al. | 370/394 |
| 2004/0039672 A1 * | 2/2004 | Zivic et al. | 705/36 |
| 2004/0042487 A1 * | 3/2004 | Ossman | 370/466 |
| 2004/0095237 A1 * | 5/2004 | Chen et al. | 340/506 |
| 2004/0199732 A1 * | 10/2004 | Kelley et al. | 711/158 |
| 2004/0230794 A1 * | 11/2004 | England et al. | 713/164 |
| 2004/0249957 A1 * | 12/2004 | Ekis et al. | 709/228 |
| 2004/0250253 A1 * | 12/2004 | Khartabil | 719/310 |
| 2005/0021680 A1 * | 1/2005 | Ekis et al. | 709/219 |
| 2006/0004933 A1 * | 1/2006 | Sen et al. | 710/48 |
| 2006/0005186 A1 * | 1/2006 | Neil | 718/1 |
| 2006/0036570 A1 * | 2/2006 | Schaefer et al. | 707/1 |
| 2006/0104295 A1 * | 5/2006 | Worley et al. | 370/401 |
| 2006/0206904 A1 * | 9/2006 | Watkins et al. | 719/321 |
| 2006/0294234 A1 * | 12/2006 | Bakke et al. | 709/225 |
| 2007/0011272 A1 * | 1/2007 | Bakke et al. | 709/217 |
| 2007/0083638 A1 * | 4/2007 | Pinkerton et al. | 709/224 |
| 2007/0124474 A1 * | 5/2007 | Margulis | 709/226 |
| 2007/0204265 A1 * | 8/2007 | Oshins | 718/1 |

* cited by examiner

METHOD AND SYSTEM TO TRANSFER DATA UTILIZING CUT-THROUGH SOCKETS

TECHNICAL FIELD

This application relates to a method and system to transfer data utilizing cut-through sockets.

BACKGROUND

Recent trends in CPU chip design provide multiple CPU cores on the same die. The cores may share a common communications bus and main memory, but cache designs may vary to include separate L1 and L2, options for shared L3, shared L2 but separate L1, and direct access L1 across cores. The use of shared memory allocation techniques that can draw memory from a large shared pool has been used in some data processing approaches. Both multi-core CPUs and shared memory allocation techniques are now used on high-performance servers.

In some high-power servers, the large amount of CPU power that they provide may, in some cases, be under-utilized. Therefore, server users have begun deploying virtualization software that permits running multiple operating system instances (guest operating systems) on a single server. The opportunities provided by virtualization, real time monitor operating systems, and multi-core CPU chipsets may be combined and improved to produce a flexible open platform for I/O control and protection along with a common management interface as a beneficial side-effect. For example, one or more processors of an endpoint device may be dedicated as a network core. The network core may be configured to host a common offload stack to provide a unified network interface for the multiple operating system instances running on the endpoint device or host.

The common offload stack may appear to the guest operating systems as being on the network. As a result, the network, file, and storage I/O functionality may allow the offload stack to function, in effect, as an intermediate embedded network device capable of bridging, switching or even routing between operating systems on the server, and off of the server when operating in conjunction with other (external) network devices deeper in a network. An offload stack in the Open Systems Interconnection Reference Model (OSI model) may include, among other components, a Transmission Control Protocol (TCP) layer, an Internet Protocol (IP) layer and an Ethernet driver.

Data exchange between two operating systems using a TCP stack may include first converting the data into TCP segments, adding IP headers with IP addresses to the data and adding MAC addresses when the data is received at the offload stack and then sending the data from the offload stack and stripping the previously added headers and reassembling the data from the TCP segments. The same operations may need to be performed even when data is exchanged between two operating systems residing on the same hardware.

BRIEF DESCRIPTION OF DRAWINGS

Embodiments of the present invention are illustrated by way of example and not limited to the figures of the accompanying drawings, in which like references indicate similar elements and in which.

DETAILED DESCRIPTION

In order to address issues associated with optimizing data transfers between two or more operating system images, a method and system are presented to transfer data utilizing cut-through sockets.

When sharing a network, block, or file system offload stack between multiple operating system images, the physical memory pages that comprise the send and receive buffer space may be assigned by a virtual machine monitor to any of the images at any time. In one embodiment, for data path connections between images that use socket protocols such as TCP, the entire TCP stack, along with the associated data copies and packetization, can be avoided by providing a cut-through socket layer that may be implemented as a part of a common offload stack.

For example, data sent on the source socket may be directly put into the receiving socket's buffer. Thus, the flow control may be provided to the sender based on the receiver's state, rather than based on the state of the sender's send buffer. The memory pages storing the data that is to be transferred from a source image to a destination image may be remapped into the memory of the destination image, thereby avoiding any data copies. In one embodiment, when both the source and the destination endpoints of the data transfer reside on the same hardware, the data transfer may be effectuated by changing the ownership of the associated data pages from the sender operating system image to the recipient operating system image instead of sending the transfer request through the TCP layer of the common offload stack.

It will be noted, that the technique described herein is not limited to a TCP layer of the offload stack, but may be used, in some embodiments, to optimize data transfers between operating system images that utilize other network protocols that are capable of transferring a data stream or a message via an IP network, e.g., User Datagram Protocol (UDP) or Stream Control Transmission Protocol (SCTP).

Example embodiments may be implemented in the context of a network environment. An example of such a network is illustrated in FIG. 1.

Figure 1:
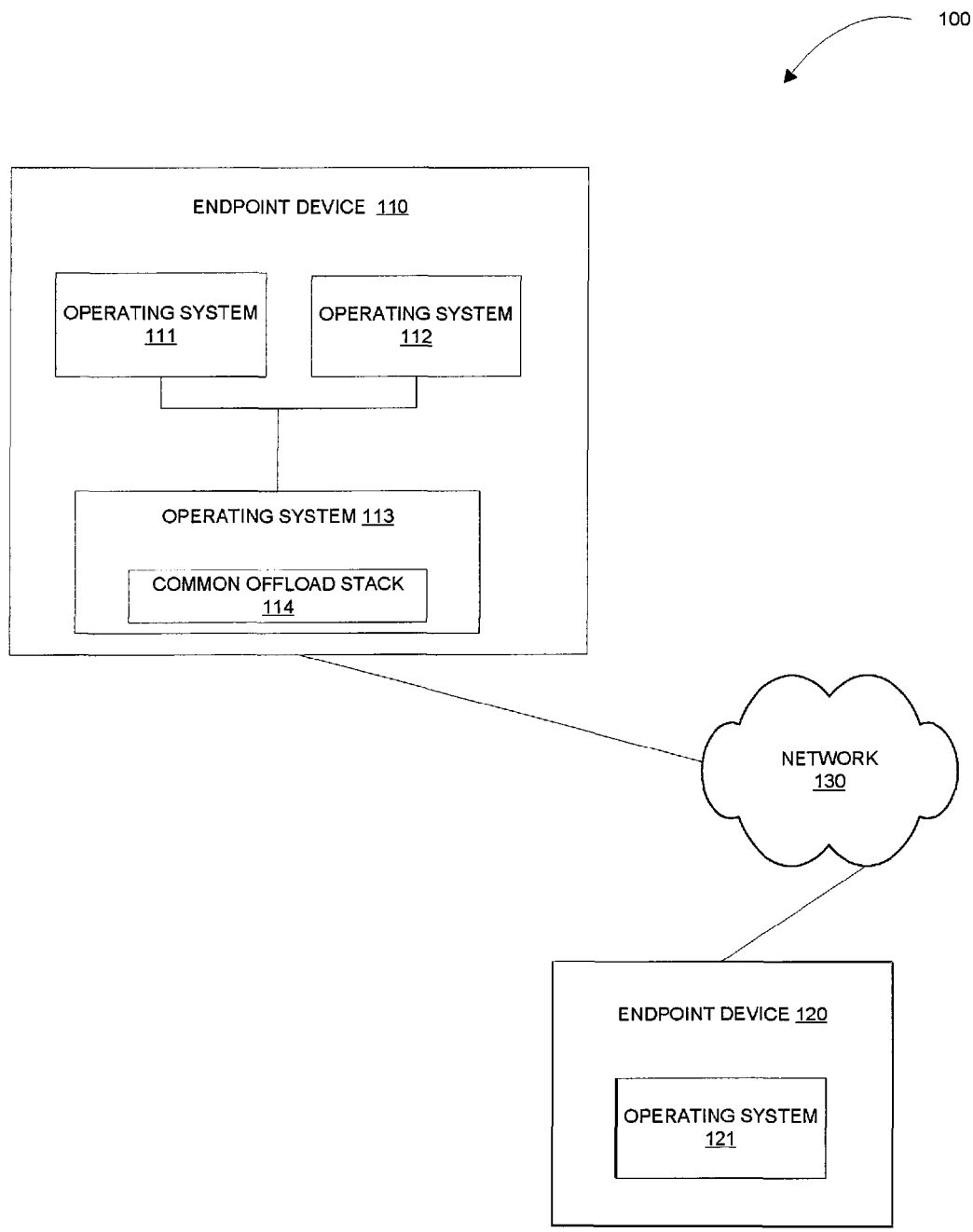
FIG. 1 shows a network environment within which an example embodiment may be implemented.

As shown in FIG. 1, a network environment 100 may include a plurality of endpoint devices, such as an endpoint device 110 and an endpoint device 120, coupled to a communications network 130. The communications network 130 may be a public network (e.g., the Internet, a wireless network, etc.) or a private network (e.g., LAN, WAN, Intranet, etc.).

The endpoint devices 110 and 120, may be, for example, server systems and may include a number of resources, such as multiple processor cores and memory, that are shared between operating systems 111, 112 and 113. Each one of the operating systems 111, 112 and 113 may be allocated some portion of the shared memory and some portion or all processing bandwidth of one or more processor cores. Such a system may be referred to as a virtual system because, while the operating systems 111, 112 and 113 may share resources, each of the operating systems may operate independently, utilizing their allocated resources, as if each was operating in a separate computer system. Thus, even though the operating systems 111 and 112 both reside of the same device 110, the operating systems 111 and 112 may function as separate network nodes (or, in other words, as separate end points in a network to which or from which data can be routed).

In the example endpoint device 110, the operating systems 111 and 112 have access to functions provided by a common offload stack 114. In one embodiment, a common offload stack may be run as a guest operating system, rather than as a software element that requires a dedicated processor core. This approach may allow the common offload stack to be hosted on only a portion of a core, on an entire core, or on a plurality of cores or, alternatively, it may run within a hyper thread on a CPU. Thus, a plurality of other guest operating systems running on other cores, CPUs, or virtualized domains can share networking, block, and file services provided by the common offload stack.

An example common offload stack may operate as described in the U.S. provisional patent application Ser. No. 60/693,133, entitled "Network Stack Offloading Approaches" filed on Jun. 22, 2005, and in U.S. patent application Ser. No. 11/386,487, entitled "Zero-copy Network and File Offload for Web and Application Servers" filed on Mar. 22, 2006, which are herein incorporated by reference.

It will be noted, that, in one embodiment, the common offload stack 114 on the endpoint device 110 may be utilized when the data exchange is requested between the operating systems residing on the same endpoint device, as well as when the data exchange is requested between the operating systems residing on different endpoint devices. As described below, the common offload stack 114 may be configured such that the communications between the operating systems residing on the same endpoint device (e.g., communications between the operating systems 111 and 112) bypass the network layers of the common offload stack 114.

Figure 2:
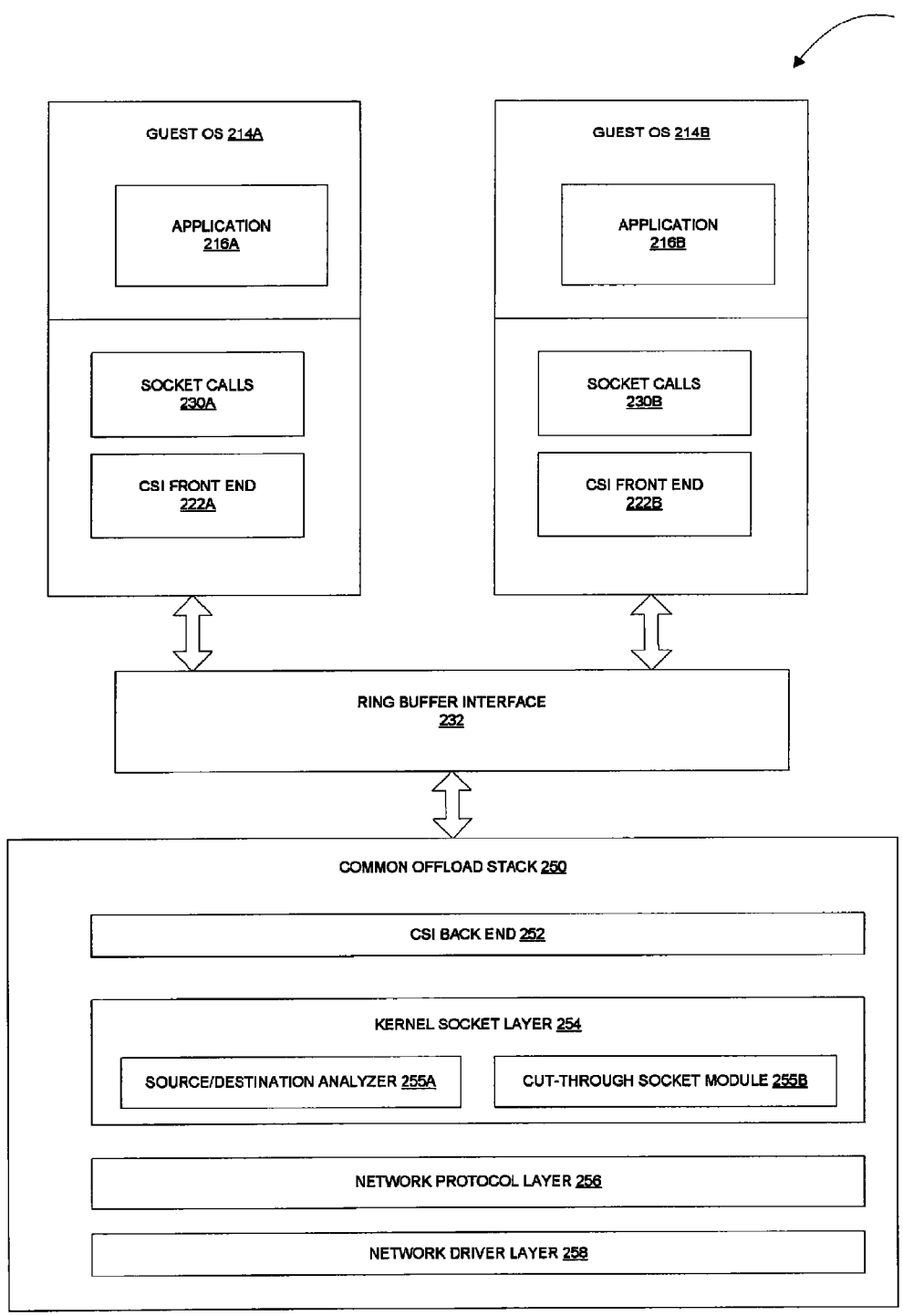
FIG. 2 is a block diagram illustrating a system utilizing a common offload stack, in accordance with an example embodiment.

FIG. 2 is a block diagram illustrating components of a system 200 utilizing a common offload stack. In the example embodiment of FIG. 2, one or more processor cores host guest operating systems 214A and 214B, each of which hosts applications 216A and 216B respectively. The applications 216A and 216B may be completely unrelated and perform different functions or provide different services.

A common offload stack 250 may be hosted by a separate operating system, for example, by a BSD, Linux, Microsoft Windows, or embedded operating system that may be simplified with fewer functions than a typical general-purpose operating system and that may be structured with enhanced security features. Further, in an alternative embodiment, the functionality provided by the hosting operating system and the common offload stack 250 may be implemented in an optimized hardware such as in a special-purpose CPU core.

A guest operating system (e.g., the guest operating systems 214A and 214B), in one embodiment, may host a common stack interface (CSI) front end, e.g., 222A, 222B, which provide a secure interface to the common offload stack 250. The applications 216A and 216B may establish socket interfaces to the common offload stack 250 utilizing socket calls modules 230A and 230B and the CSI front end (e.g., 222A and 222B) in order to obtain certain functions from the common offload stack 250.

The common offload stack 250, in one embodiment, comprises a CSI back end to receive calls from the guest operating systems, a kernel socket layer 254 to process the calls, a network protocol layer 256 and a network driver layer 258. The kernel socket layer 254 may, in turn, comprise a source/destination analyzer 255A to determine whether the source and the destination associated with the received call reside on the same hardware system, and a cut-though socket module 255B to process the call without invoking the functionality of the network protocol layers 256 and the network driver layers 258.

As shown in FIG. 2, a ring buffer interface 232 may be interposed between the guest operating systems 214A and 214B and the common offload stack 250. The ring buffer interface 232 may be configured to mediate mutually exclusive calls that may originate from the guest operating systems 214A and 214B. The calls mediated through the ring buffer interface 232 arrive at a CSI back end 252.

In one embodiment, socket calls originated at the socket calls modules 230A and 230B of the guest operating systems terminate at the kernel socket layer 254 provided with the common offload stack 250. In certain embodiments, the functional elements of the operating system hosting the common offload stack 250 can supplement some of the functions of common offload stack 250. For example, in a system that utilizes FreeBSD to host the common offload stack 250, the common offload stack 250 may be configured to process messages via the TCP stack that is already provided with the FreeBSD.

Figure 3:
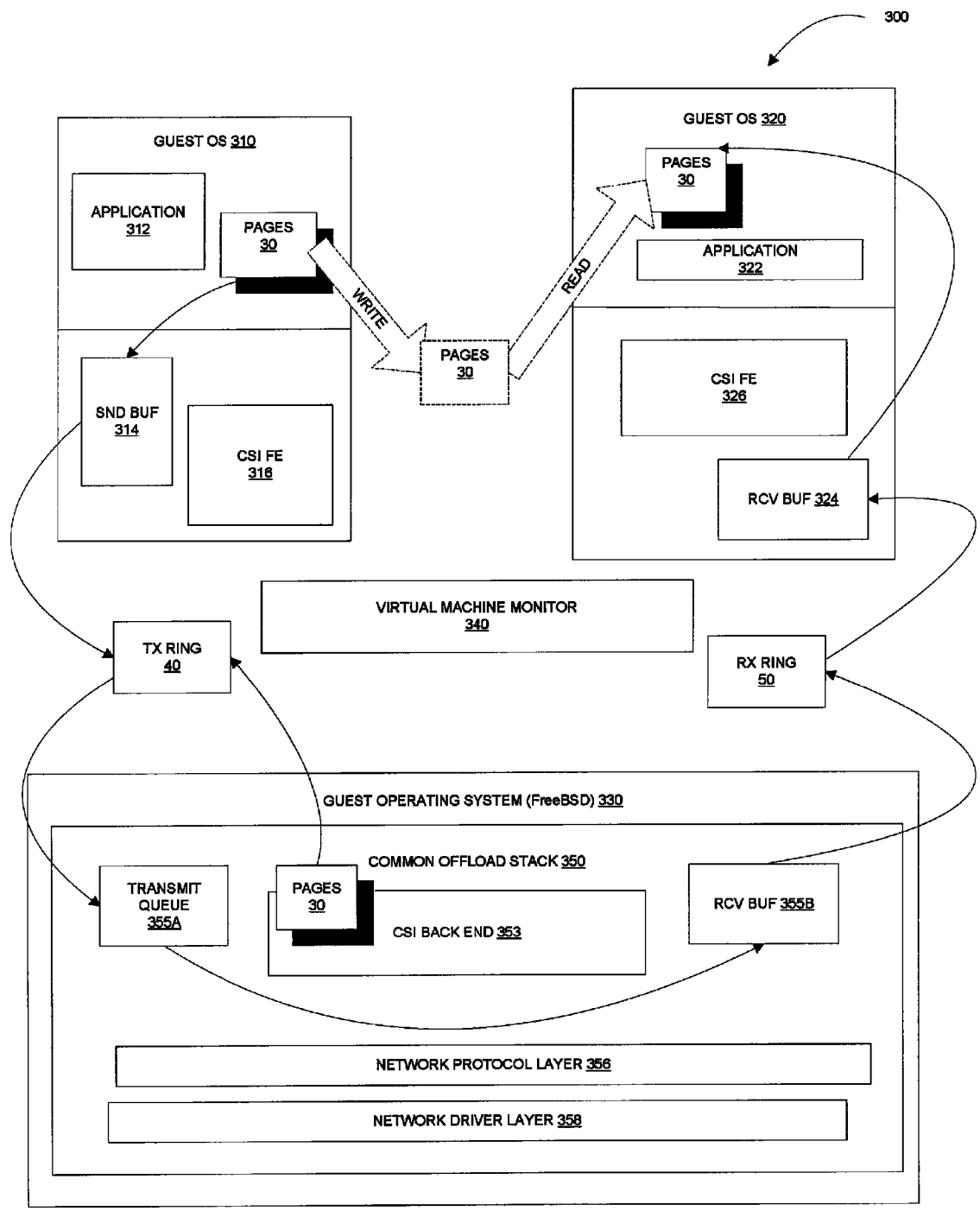
FIG. 3 is a block diagram illustrating example operations performed by various components of a system to effectuate cut-through socket data transfer, in accordance with an example embodiment.

FIG. 3 is a block diagram illustrating example operations performed by various components of a system 300 to effectuate cut-through socket data transfer. The system 300 comprises guest operating systems 310 and 320 running user applications 312 and 322 respectively and a guest operating system 330 (e.g., FreeBSD) running a common offload stack 350. Each one of the guest operating systems 310, 320 and 330 have access to respective memory pages 30. A virtual machine monitor 340 may be configured to manage memory that may be passed between the guest operating systems 310, 320 and 330, e.g., via a transmit ring 40 and a receive ring 50. In one embodiment, the data structures of the transmit ring 40 and the receive ring 50 are managed via the ring buffer interface 232 of FIG. 2.

For the purposes of the discussion with reference to FIG. 3, the assumption is made that a socket has been established between the guest operating systems 310 and 320 in order to allow the guest operating systems 310 and 320 to communicate and exchange data with each other. It will be noted, that the guest operating systems 310 and 320 may be different operating systems or different versions of the same operating system.

In one embodiment, in order to transfer subject data to the application 322 running on the guest operating system 320, the guest operating system 310 may initiate a send operation by writing the subject data to one or more memory pages (the source pages) from the pages 30 associated with the guest operating system 310 and sending the pointers to the source pages to a socket writer send call (e.g., the socket calls module 230A of FIG. 2). The pointers to the source pages and other information associated with the subject data (collectively referred to as descriptors) are then placed in a send (SND) buffer 314 that resides in the kernel space of the guest operating system 310. Next, this information is processed by the front end of the common offload stack interface (the CSI FE 316).

The CSI FE 316 transfers into transmit ring 40 the pointers to the source pages and other relevant information (e.g., the amount of data to be used out of each page, etc.) and sends an event to the CSI back end 353 to indicate that data is available to be transferred to the guest operating system 320.

The CSI back end 353 will detect the event, pull from the transmit ring 40 the available information (the pointers to the source pages, the length of the source pages, etc.) and send this information to a queue that it maintains (e.g., a transmit queue 355A). In an example embodiment, the CSI back end 353 allocates memory to manage the source memory pages and swaps the source memory pages with memory pages owned by a kernel of the offload stack 350.

The CSI back end 353 then determines whether the designated recipient for the subject data resides on the same hardware as the guest operating system 310 that originated the send request. This determination may be performed by the source/destination analyzer 255A illustrated in FIG. 2. For example, if the source/destination analyzer 255A determines that the other end of the socket is on a different machine, then the CSI back end 353 may effectuate network protocol layer calls and send the subject data and other relevant information over the network interface of the common offload stack 350 and the guest operating system 330 that hosts it.

If the CSI back end 353 determines that both ends of the socket established between a source OS and a destination OS (here, the guest operating systems 310 and 320) are on the same machine, the pointers to the source pages may be transferred from the transmit queue 355A, via the connection's receive buffer 355B, to the buffers of the receive ring 50. It will be noted, that, in an example embodiment, the receive buffer 355B is a socket interface concept, where a "receive buffer" is provided per connection. The rings 40 and 50 are used by all connections of a guest operating system. Thus, there is an instance of the rings 40 and 50 for each guest operating system.

From the receive ring 50, the pointers to the source pages may be transferred to the receive buffer 324 maintained in the kernel space of the guest operating system 320. For example, the guest operating system 320 may detect an indication that it has to pull information from the receive ring 50, obtain the descriptors including the pointers to the source pages off the receive ring 50 and then put them in its own kernel specific receive buffer structures 324. These operations may be accomplished utilizing the CSI FE 326 running in the kernel space of the guest operating system 320. From the kernel space of the guest operating system 320, the source pages may be accessed by an application 322 running in the user space of the guest operating system 320 by any means available to the guest operating system 320.

Thus, when one guest operating system sends data over to another guest operating system, the source data is written into a memory page. That memory page is transferred into the ownership of the receiving guest operating system such that there is no need for copying the memory. Furthermore, the network stack of the common offload stack may be bypassed if both the source OS and the destination OS reside on the same endpoint device, which may further improve performance. An example method of a cut-through socket data transfer is described with reference to FIG. 4.

Figure 4:
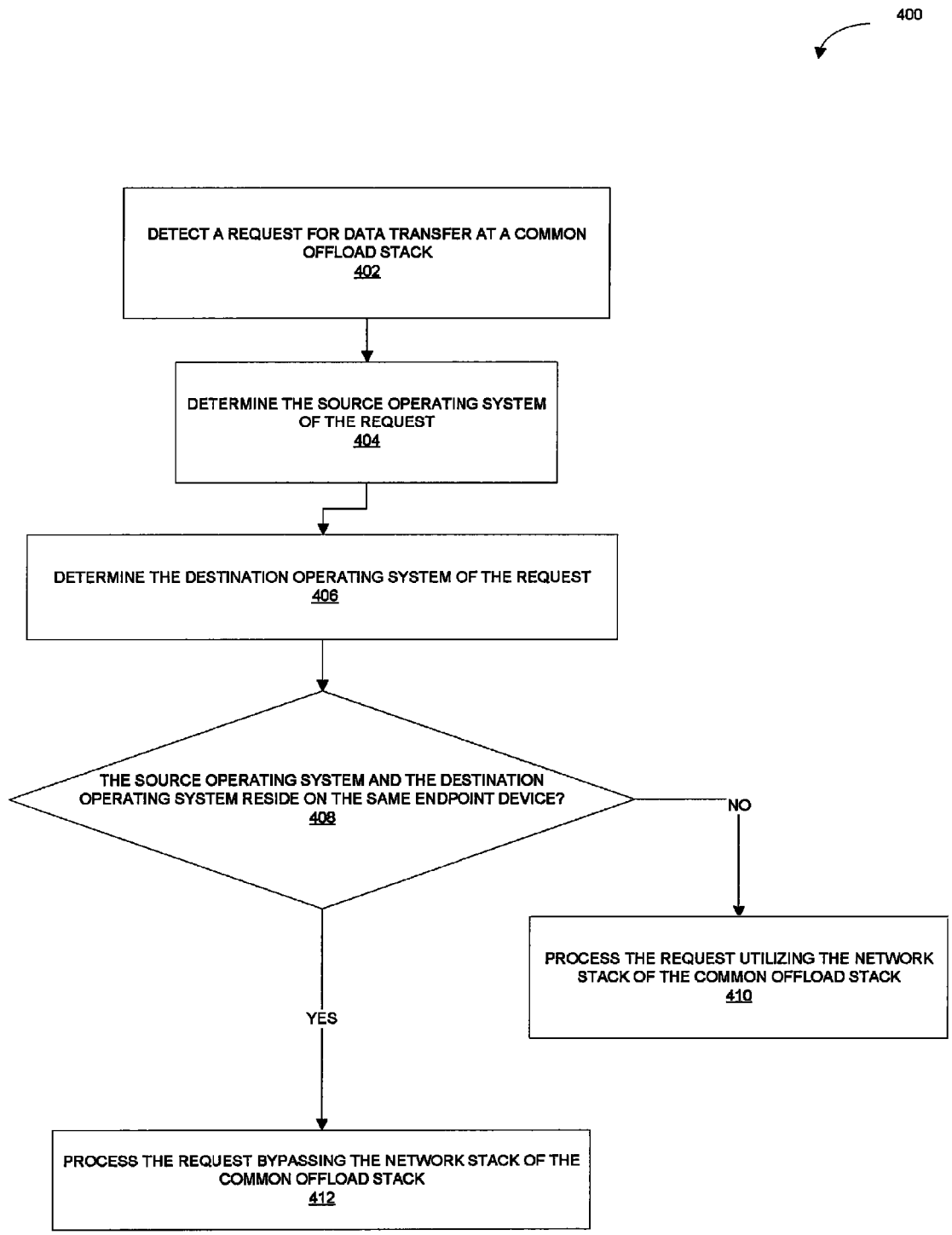
FIG. 4 is a flow chart illustrating a method to effectuate cut-through socket data transfer, in accordance with an example embodiment.

FIG. 4 is a flow chart of a method 400 to effectuate cut-through socket data transfer, in accordance with an example embodiment. The method 400 may be performed by processing logic that may comprise hardware (e.g., dedicated logic, programmable logic, microcode, etc.), software (such as run on a general purpose computer system or a dedicated machine), or a combination of both. In an example embodiment, processing logic resides at a computer system 110 of FIG. 1.

As shown in FIG. 4, the method 400 commences at operation 402. At operation 402, the processing logic detects a request for data transfer at a common offload stack, e.g., at the CSI back end 252 illustrated in FIG. 2. At operation 404, the processing logic of the common offload stack (e.g., the source/destination analyzer 255A of FIG. 2) determines the source operating system associated with the request and the destination operating system associated with the request at operation 406.

At operation 408, the processing logic determines whether the source operating system and the destination operating system reside on the same endpoint device. If it is determined that the source operating system and the destination operating system do not reside on the same endpoint device, the common offload stack processes the request utilizing its network stack, e.g., the network protocol layers and the network driver layers (operation 410). If it is determined that the source operating system and the destination operating system share the same endpoint device, the common offload stack processes the request bypassing its network stack (operation 412), as discussed above with reference to FIG. 3.

In an example embodiment, this processing is performed during connection setup for TCP, such that when the data transfer is occurring, the process 400 is utilized as a quick check. For UDP, the full procedure is performed with each packet. Furthermore, the operations 410 and 412 may include a policy-based decision mechanism to determine whether to allow the page mapping based upon security settings or other rules (such as, e.g., compliance or licensing) that can restrict communications.

Although the embodiments are described herein with reference to an offload stack interface, the techniques may be advantageously utilized with other stacks, e.g., Message Passing Interface (MPI-2), Sockets Direct Protocol (SDP), or other stream or message-passing protocols.

Figure 5:
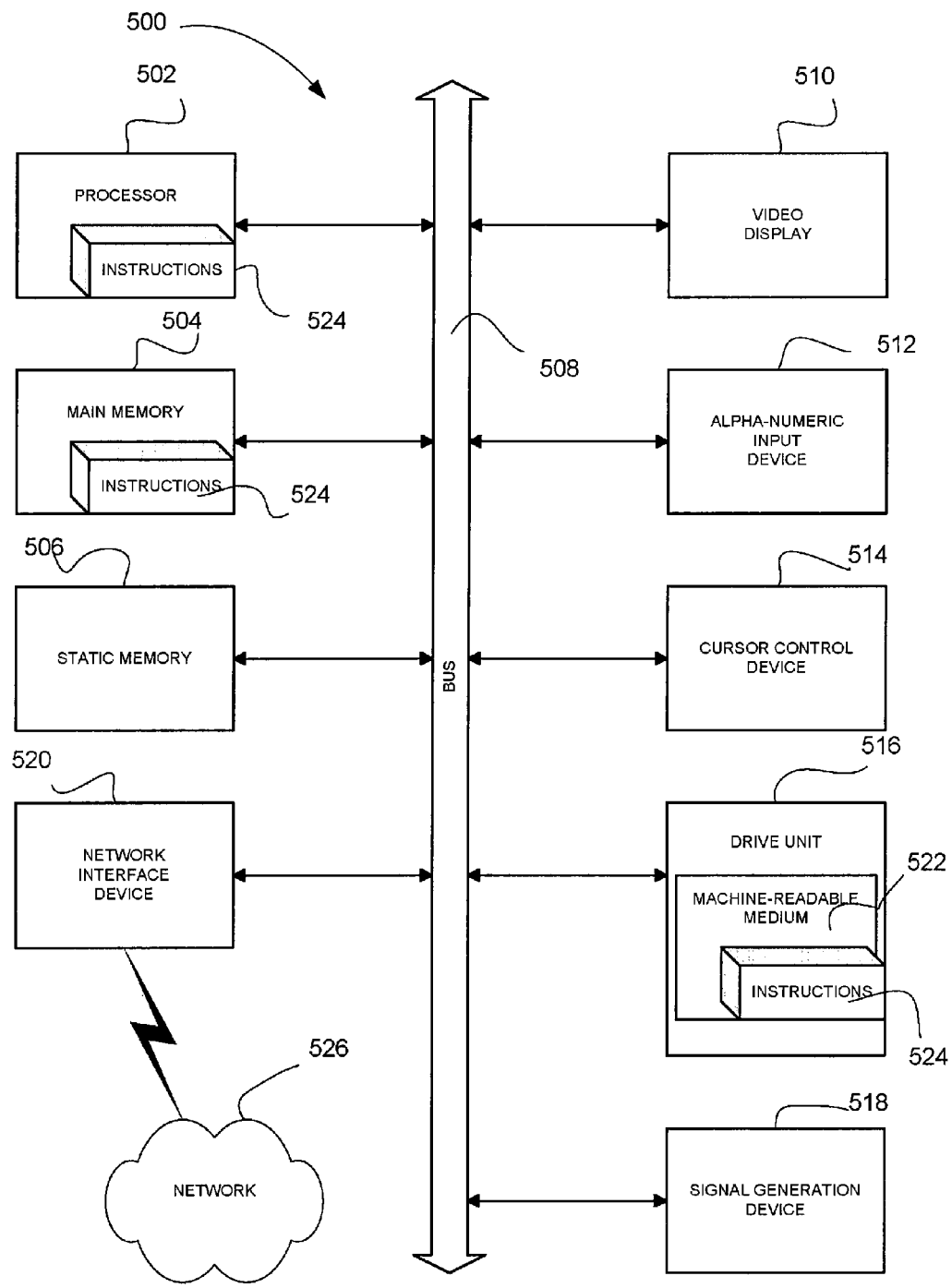
FIG. 5 illustrates a diagrammatic representation of an example machine in the form of a computer system within which a set of instructions, for causing the machine to perform any one or more of the methodologies discussed herein, may be executed.

FIG. 5 shows a diagrammatic representation of machine in the example form of a computer system 500 within which a set of instructions, for causing the machine to perform any one or more of the methodologies discussed herein, may be executed. In alternative embodiments, the machine operates as a standalone device or may be connected to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as an MP3 player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a user interface (UI) navigation device 514 (e.g., a mouse), a disk drive unit 516, a signal generation device 518 (e.g., a speaker) and a network interface device 520.

The disk drive unit 516 includes a machine-readable medium 522 on which is stored one or more sets of instructions and data structures (e.g., software 524) embodying or utilized by any one or more of the methodologies or functions described herein. The software 524 may also reside, completely or at least partially, within the main memory 504 and/or within the processor 502 during execution thereof by the computer system 500, the main memory 504 and the processor 502 also constituting machine-readable media.

The software 524 may further be transmitted or received over a network 526 via the network interface device 520 utilizing any one of a number of well-known transfer protocols (e.g., HTTP).

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals. Such medium may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware.

Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A system to exchange information, the system comprising:
   a source operating system residing on a device comprising one or more processors, source operating system configured to write data to a memory page;
   a destination operating system residing on the device, the source operating system and the destination operating system being distinct network nodes and having a shared memory, the shared memory of the source operating system and the destination operating system comprising the memory page; and
   an offload stack residing on the device and hosted by a third operating system separate from the source operating system and the destination operating system, the offload stack to function as an intermediate network device for the source operating system;
   wherein the offload stack comprises:
      a back end to receive a message from the source operating system to the destination operating system, the message from the source operating system comprising a request to transfer source data from the source operating system to the destination operating system,
      an analyzer to determine that the source operating system and the destination operating system both reside on the same device, and
      a cut through socket module to process the message such that a network layer of the offload stack is bypassed in response to the analyzer determining that the source operating system and the destination operating system both reside on the device, wherein processing the message such that the network layer is bypassed comprises transferring a pointer to the memory page from the source operating system to the destination operating system,
   the offload stack being configured to transfer the source data from the source operating system to the destination operating system by transferring ownership of memory pages storing the source data.

2. The system of claim 1, wherein the offload stack is to run on a first processor core and the source operating system is to run on a second processor core.

3. The system of claim 1, wherein the offload stack comprises a transmit queue to receive pointers to the memory pages storing the source data.

4. The system of claim 1, further comprising:
   an offload stack front end to run on the source operating system; and
   a ring buffer interface to bridge the source operating system and the offload stack.

5. The system of claim 4, wherein the ring buffer interface is to receive pointers to memory pages storing data associated with the message from the source operating system.

6. The system of claim 1, wherein the source operating system and the destination operating system are distinct operating systems.

7. The system of claim 1, wherein the source operating system and the destination operating system are two versions of an operating system.

8. A method to exchange information between computer applications, the method comprising:
   receiving, at an offload stack hosted on a device comprising one or more processors, a message from a source operating system to a destination operating system, the source operating system and the destination operating system being distinct network nodes and having a shared memory, the shared memory of the source operating system and the destination operating system comprising a memory page to which data from the source operating system has been written, the offload stack being hosted by a third operating system separate from the source operating system and the destination operating system, the message from the source operating system comprising a request to transfer source data from the source operating system to the destination operating system;
   determining by the offload stack, that the source operating system and the destination operating system are both hosted on the device;
   transferring the message to the destination operating system such that a network layer of the offload stack is bypassed in response to the determination that the source operating system and the destination operating system are both hosted on the device, wherein transferring the message such that the network layer is bypassed comprises transferring a pointer to the memory page from the source operating system to the destination operating system; and transferring, by the offload stack, the source data from the source operating system to the destination operating system by transferring ownership of memory pages storing the source data.

9. The method of claim 8, wherein the processing of the message such that a network layer of the offload stack is bypassed comprises:
determining a pointer to a memory page associated with the message from the source operating system;
placing the pointer into a transmit queue of the offload stack; and
sending the pointer to a socket layer of the destination operating system.

10. The method of claim 9, further comprising:
allocating memory to manage the memory page associated with the message from the source; and
swapping the memory page associated with the message from the source with a memory page owned by a kernel of the offload stack.

11. The method of claim 10, further comprising swapping the memory page owned by the kernel of the offload stack with a memory page owned by the destination operating system.

12. The method of claim 8, wherein the source operating system and the destination operating system are distinct operating systems.

13. The method of claim 8, wherein the source operating system and the destination operating system are two versions of an operating system.

14. The method of claim 8 comprising establishing a socket between the source operating system and the destination operating system.

15. The method of claim 14, wherein the established socket uses a Transmission Control Protocol (TCP).

16. The method of claim 14, wherein the established socket uses a User Datagram Protocol (UDP).

17. A non-transitory machine-readable storage medium having instructions which, when executed by a machine, cause the machine to:
receive, at an offload stack hosted on a device, a message from a source operating system to a destination operating system, the source operating system and the destination operating system being distinct network nodes and having a shared memory, the shared memory of the source operating system and the destination operating system comprising a memory page to which data from the source operating system has been written, the offload stack being hosted by a third operating system separate from the source operating system and the destination operating system, the message from the source operating system comprising a request to transfer source data from the source operating system to the destination operating system;
determine, at the offload stack, that the source operating system and the destination operating system are both hosted on the device;
transfer the message to the destination operating system such that a network layer of the offload stack is bypassed in response to the determination that the source operating system and the destination operating system are both hosted on the device, wherein transferring the message such that the network layer is bypassed comprises transferring a pointer to the memory page from the source operating system to the destination operating system; and
transfer, by the offload stack, the source data from the source operating system to the destination operating system by transferring ownership of memory pages storing the source data.

18. A system to exchange information between computer applications, the system comprising:
means for receiving, at an offload stack hosted on a device, a message from a source operating system to a destination operating system, the source operating system and the destination operating system being distinct network nodes and having a shared memory, the shared memory of the source operating system and the destination operating system comprising a memory page to which data from the source operating system has been written, the offload stack being hosted by a third operating system separate from the source operating system and the destination operating system, the message from the source operating system comprising a request to transfer source data from the source operating system to the destination operating system;
means for determining, at the offload stack, that the source operating system and the destination operating system are both hosted on the device; and
means for transferring the message to the destination operating system such that a network layer of the offload stack is bypassed in response to the determination that the source operating system and the destination operating system are both hosted on the device, wherein the means for transferring the message comprises means for transferring a pointer to the memory page from the source operating system to the destination operating system; and
means for transferring, at the offload stack, the source data from the source operating system to the destination operating system by transferring ownership of memory pages storing the source data.

* * * * *